United States Patent
Meuwly et al.

[11] Patent Number: 5,837,792
[45] Date of Patent: Nov. 17, 1998

[54] POLYSILOXANE LIGHT STABILIZERS

[75] Inventors: Roger Meuwly, Cournillens, Switzerland; Andreas Valet, Binzen, Germany

[73] Assignee: Ciba Specialty Chemicals Corporation, Tarrytown, N.Y.

[21] Appl. No.: 662,578

[22] Filed: Jun. 13, 1996

[30] Foreign Application Priority Data

Jun. 23, 1995 [CH] Switzerland .................. 01 1854/95

[51] Int. Cl.⁶ .................................................. C08G 77/26
[52] U.S. Cl. ........................... 528/27; 544/180; 544/216; 524/91; 528/27; 528/31; 556/407
[58] Field of Search ................... 544/180, 46; 524/91; 528/27, 31; 556/407

[56] References Cited

U.S. PATENT DOCUMENTS

| | | | |
|---|---|---|---|
| 4,859,759 | 8/1989 | Maycock et al. | 528/27 |
| 4,923,914 | 5/1990 | Nohr et al. | 524/99 |
| 5,102,707 | 4/1992 | Canivenc et al. | 428/44 |
| 5,185,445 | 2/1993 | Meuwly et al. | 544/216 |
| 5,198,498 | 3/1993 | Valet et al. | 525/125 |
| 5,300,414 | 4/1994 | Leppard et al. | 430/507 |
| 5,356,995 | 10/1994 | Valet et al. | 525/100 |
| 5,364,749 | 11/1994 | Leppard et al. | 430/507 |
| 5,420,204 | 5/1995 | Valet et al. | 525/125 |

FOREIGN PATENT DOCUMENTS

| | | |
|---|---|---|
| 0388218 | 9/1990 | European Pat. Off. . |
| 0502821 | 9/1992 | European Pat. Off. . |
| 0530135 | 9/1993 | European Pat. Off. . |

OTHER PUBLICATIONS

Chem. Abst. 119:213920N of EP0530,135.

*Primary Examiner*—Margaret W. Glass
*Attorney, Agent, or Firm*—Luther A. R. Hall

[57] ABSTRACT

Oligomeric or polymeric siloxanes of the formula I

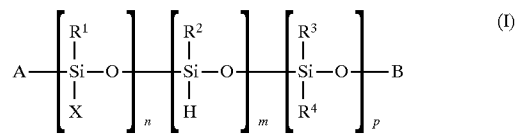

if X is a monovalent radical, or which are correspondingly crosslinked, if X is a polyvalent radical, whose repeating units are arranged randomly or in blocks, which contain hydroxy-phenyl-diaryl-s-triazine moieties, are useful as stabilizers for organic material against damage thereto by light, oxygen and heat; and especially as stabilizers for coating materials.

5 Claims, No Drawings

POLYSILOXANE LIGHT STABILIZERS

The invention relates to oligo- or polysiloxanes containing at least one side chain of the hydroxyphenyl-diaryl-s-triazine type and to their use as stabilizers for organic material.

The properties of a light stabilizer are determined not only by the active centre, for example by the spectral properties of the UV-absorbing chromophore. Also of critical importance are those units of the molecule which primarily determine ease of incorporation and mobility in the substrate.

A particular class of light stabilizers is constituted by the silicon-containing stabilizers, a general feature of which is that they comprise silicon in the form of monomeric silane or siloxane units or in the form of oligosiloxane or polysiloxane chains.

The coupling of some UV absorbers of the o-hydroxyphenyl-benzotriazole type to polysiloxanes has been described, for example, in U.S. Pat. No. 4,859,759, U.S. Pat. No. 4,923,914 and U.S. Pat. No. 5,102,707.

The copolymerization of a UV absorber of the hydroxyphenyl-diaryl-s-triazine type to Si-containing acrylate by way of an acrylate unit is described in U.S. Pat. No. 5,198,498 and U.S. Pat. No. 5,356,995.

U.S. Pat. No. 5,420,204 describes the coupling of certain reactive UV absorbers of the hydroxy-phenyl-diaryl-s-triazine type with a copolymer containing disiloxane side chains.

Specific monomeric stabilizers of the hydroxyphenyl-diaryl-s-triazine type with organosilicon radicals are proposed, inter alia, in U.S. Pat. No. 5,185,445, EP-A-530, 135, U.S. Pat. No. 5,364,749 and U.S. Pat. No. 5,300,414.

Moreover, U.S. Pat. No. 5,185,445 describes an oligosiloxane in which each silicon atom carries a side chain of the 4-[2,4-bis(2,4-dimethylphenyl)-1,3,5-triazin-6-yl]-3-hydroxyphenyl-oxypropyl type, and which is obtained by polymerization of a corresponding silyl-containing monomer.

It has now been found that certain oligosiloxanes or polysiloxanes containing at least one side chain of the hydroxyphenyl-diaryl-s-triazine type are of surprisingly high suitability as light stabilizeres. These novel compounds are oligomers or polymers of the formula I

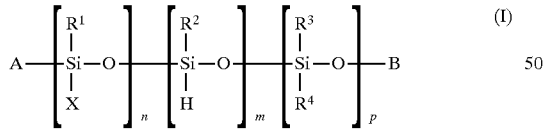

if X is a monovalent radical, or are correspondingly crosslinked compounds if X is a polyvalent radical, it being possible for the units of the formulae Ia, Ib and/or Ic

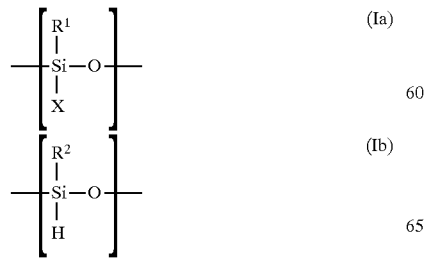

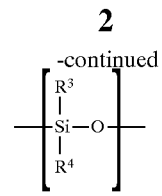

to be arranged randomly or in blocks, and in which n is a number from the range 1–100;

m is a number from the range 0–100;

p is a number from the range 0–100;

A is a radical of the formula

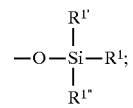

B is a radical of the formula

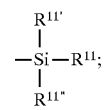

or A and B, where the sum n+m+p is a number from the range 3–10 and the sum m+p is greater than 0 can together be a direct bond;

$R^1$, $R^{1'}$, $R^{1''}$, $R^{11}$, $R^{11'}$, $R^{11''}$, $R^2$ and $R^3$, independently of one another, are $C_1$–$C_{18}$alkyl, $C_5$–$C_{12}$cycloalkyl or phenyl;

$R^4$ is $C_1$–$C_{18}$alkyl, phenyl, $C_2$–$C_6$hydroxyalkyl, $C_2$–$C_6$aminoalkyl,

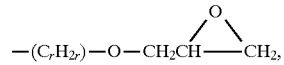

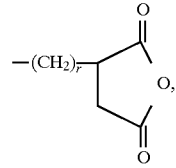

or

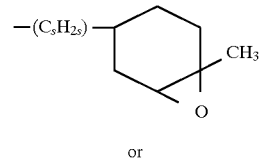

where r is a number from the range 2–6 and s is 2 or 3;

X is a mono- or divalent radical of the formula II

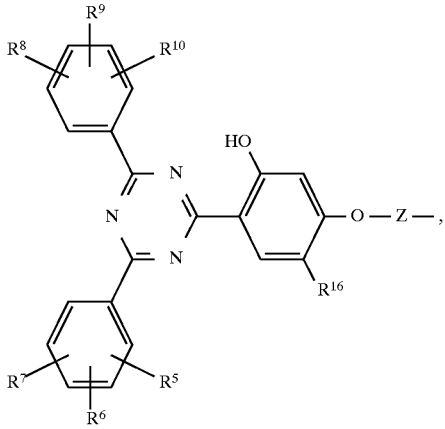

(II)

where
$R^5$ and $R^7$, independently of one another, are hydrogen, $C_1$–$C_{12}$alkyl, $C_3$–$C_6$alkenyl, halogen or CN;
$R^6$ is hydrogen, $C_1$–$C_{12}$alkyl, $C_3$–$C_6$alkenyl, halogen, CN, a cycloaliphatic, saturated hydrocarbon radical containing 5–12 carbon atoms, or is phenyl; or
$R^5$ is OH, $C^1$–$C_{18}$alkoxy or $C_3$–$C_6$alkenoxy; $R^7$ is hydrogen; and $R^6$ as a monovalent radical is OH, $C_1$–$C_{18}$alkoxy, $C_3$–$C_6$alkenoxy or —O—$CH_2$—CH($OR^{12}$)—$CH_2$—O—$R^{17}$, or $R^6$ is a divalent radical of the formula —O—Z— which is attached to the phenyl ring by the oxygen atom;
$R^8$ is as defined for $R^5$;
$R^9$ is as defined for $R^6$; and
$R^{10}$ is as defined for $R^7$;
$R^{12}$ is hydrogen or $C_1$–$C_{18}$alkyl;
$R^{16}$ is hydrogen, $C_1$–$C_{24}$alkyl, $C_5$–$C_{12}$cycloalkyl or $C_7$–$C_{15}$phenylalkyl;
$R^{17}$ is $C_1$–$C_{18}$alkyl;
—O—Z— is a divalent radical which is attached to the phenyl ring by the oxygen atom and is of the formula —O—$(CH_2)_q$—O—$R^{21}$—,

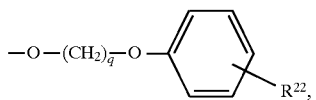

—O—$CH_2$—CH($OR^{12}$)—$CH_2$—O—$(CH_2)_t$—,

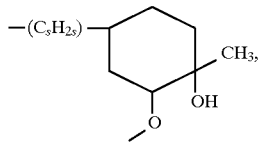

—O—CH($R^{12}$)—CO—O—$(CH_2)_w$—, or is —O—$C_3$—$C_{18}$alkylene;
$R^{21}$ is $C_3$—$C_{12}$alkylene or cyclohexylene; and
$R^{22}$ is $C_2$—$C_{12}$alkylene;
q being a number from the range 2–4, t a number from the range 3–4 and w a number from the range 3–12.

Where A and B together are a direct bond, the resulting compound of the formula I is cyclic.
$R^5$ and/or $R^8$ as OH, alkoxy or alkenoxy are preferably ortho to the triazine ring.
When m=0 and p=0, the compound of the formula I is an oligomer comprising at least 1 unit of the formula Ia

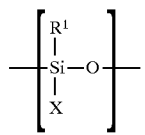

(Ia)

or is a homopolymer of these units, the end groups being formed in each case by A and B.

Where m or p or m and p is or are other than 0, the compound of the formula I comprises the units of the formulae Ia, Ib and/or Ic

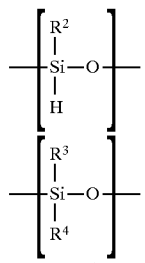

(Ib)

(Ic)

in any desired sequence, random or block copolymers being possible.

The units of the formulae Ia, Ib and/or Ic in the compound of the formula I can be identical or different.

Where X is monovalent, the compounds of the formula I are linear; in the case of polyvalent radicals X, the compounds of the formula I are crosslinked.

Of particular industrial importance are novel compounds of the formula I or corresponding crosslinked compounds in which X is a monovalent or divalent radical. Linear compounds of the formula I are preferred.

Preference is also given to novel compounds comprising 1–30 units of the formula Ia, 0–20 units of the formula Ic and 0–20, especially 0–10, units of the formula Ib; particular preference is given to linear compounds of the formula I in which n is a number from the range 1–30, m is a number from the range 0–20, especially 0–10, and p is a number from the range 0–20.

There is particular industrial interest in novel compounds comprising 1–100 units of the formula Ia and/or 0–100 units of the formula Ic, the sum of the units of the formulae Ia and Ic being from 3 to 100 and the total number of silicon atoms in the units of the formula Ib not exceeding 5% of the silicon atoms present in the molecule as a whole; of particular industrial interest are compounds of the formula I in which the following conditions are met simultaneously:
$1 \leq n \leq 100$;
$0 \leq m \leq 0.05(m+p)$;
$0 \leq p \leq 100$, and
$3 \leq n+p \leq 100$.

Particular preference is given to compounds of the formula I in which m is 0.

A cycloaliphatic, saturated hydrocarbon radical containing 5–12 carbon atoms comprises $C_5$—$C_{12}$cycloalkyl and also mixed cycloalkyl/alkyl radicals having the corresponding number of carbon atoms, for example alkyl-substituted cycloalkyl, cycloalkyl-substituted alkyl, and alkyl which is interrupted by cycloalkyl.

$R^5$ and $R^8$ are preferably ortho to the triazine ring. $R^6$ and $R^9$ are preferably para to the triazine ring.

In formula II the phenyl radicals substituted by $R^5$, $R^6$ and $R^7$ or, respectively, $R^8$, $R^9$ and $R^{10}$, where $R^5$ or R8 is OH, alkoxy or alkenoxy, are preferably derived from resorcinol, so that the radicals $R^5$ and $R^6$ or, respectively, $R^8$ and $R^9$ are meta to one another. In the radical of the formula II, the substituents $R^5$ and/or R8 as one of OH, alkoxy and alkenoxy, and especially as OH, are with particular preference ortho to the triazine ring, so that the substituents $R^6$ and/or $R^9$ are then para to the triazine ring.

A halogen substituent is —F, —Cl, —Br or —I; preference is given to —Cl or —F, especially to —Cl.

$C_1$–$C_{18}$Alkyl radicals $R^1$ to $R^{12}$, $R^{16}$ and $R^{17}$, within the scope of the definitions given, are, for example, methyl, ethyl, propyl, isopropyl, butyl, isobutyl, tert-butyl, pentyl, hexyl, heptyl, octyl, nonyl, decyl, undecyl, dodecyl, tridecyl, tetradecyl, pentadecyl, hexadecyl, heptadecyl or octadecyl.

Compounds in which $R^{16}$ is hydrogen are preferred.

There is particular industrial interest in compounds in which $R^1$, $R^{1'}$, $R^{1''}$, $R^{11}$, $R^{11'}$, $R^{11''}$, $R^2$ and $R^3$ are identical.

$R^1$, $R^{1'}$, $R^{1''}$, $R^{11}$, $R^{11'}$, $R^{11''}$, $R^2$ and $R^3$ are preferably lower alkyl, especially methyl.

$C_5$–$C_{12}$Cycloalkyl $R^1$, $R^{1'}$, $R^{1''}$, $R^{11}$, $R^{11'}$, $R^{11''}$, $R^2$ and $R^3$, and $R^6$ and $R^9$ as cycloaliphatic radicals, comprise for example cyclopentyl, cyclohexyl, cycloheptyl, cyclooctyl, cyclononyl, cyclodecyl, cycloundecyl and cyclododecyl.

The novel compounds are preferably open-chain compounds. With particular preference, A and B are trialkylsilyloxy or trialkylsilyl, especially trimethylsilyloxy or trimethylsilyl.

$C_2$–$C_6$Hydroxyalkyl or $C_2$–$C_6$aminoalkyl $R^4$ is, for example, hydroxy- or aminoethyl, -propyl, -butyl, -pentyl, or -hexyl; preference is given to straight-chain radicals, especially those in which the hydroxyl or amino group is at the end, for example 3-hydroxypropyl or 3-aminopropyl.

$R^4$ as a radical of the formula

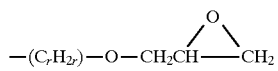

usually contains an unbranched alkylene chain

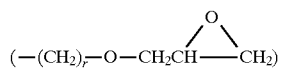

and is preferably 3-glycidyloxypropyl.

$R^4$ as a radical of the formula

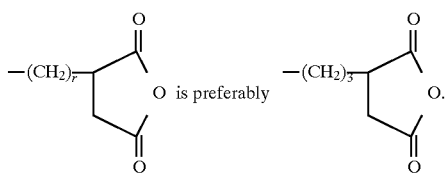

O is preferably $R^4$ as a radical of the formula

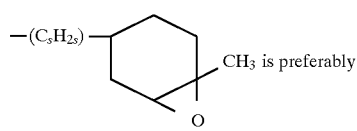

CH$_3$ is preferably

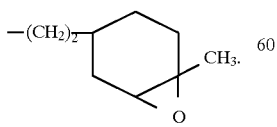

$C_3$–$C_6$alkenyl radical(s) $R^5$ to $R^{10}$ is or are, for example, propenyl, butenyl, pentenyl or hexenyl; allyl (2-propenyl) is preferred.

Preference is given to novel compounds of the formula I or correspondingly crosslinked compounds in which X is a radical of the formula IIa

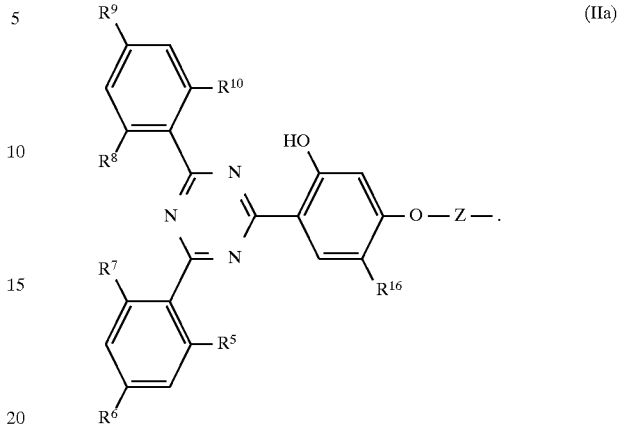

Of these, particular importance attaches to the compounds of the formula I or corresponding crosslinked compounds in which $R^1$, $R^{1'}$, $R^{1''}$, $R^{11}$, $R^{11'}$, $R^{11''}$, $R^2$ and $R^3$ are methyl; $R^4$ is $C_1$–$C_{18}$alkyl, hydroxypropyl, aminopropyl or

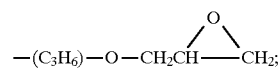

$R^5$ and $R^7$ are, independently of one another, hydrogen or $C_1$–$C_4$alkyl;
$R^6$ is hydrogen, $C_1$–$C_4$alkyl or phenyl; or
$R^5$ is OH or $C_1$–$C_6$alkoxy or $C_3$–$C_6$alkenoxy; $R^7$ is hydrogen; and $R^6$ as a monovalent radical is one of OH, $C_1$–$C_6$alkoxy or —O—CH$_2$—CH(OR$^{12}$)—CH$_2$—O—R$^{17}$, or $R^6$ is a divalent radical of the formula —O—Z— which is attached to the phenyl ring by the oxygen atom;
$R^8$ is as defined for $R^5$;
$R^9$ is as defined for $R^6$; and
$R^{10}$ is as defined for $R^7$; $R^{12}$ is hydrogen or $C_1$–$C_8$alkyl;
$R^{16}$ is hydrogen;
$R^{17}$ is $C_1$–$C_{18}$alkyl; and
—O—Z— is a radical which is attached to the phenyl ring by the oxygen atom and is of the formula —O—CH$_2$—CH(OR$^{12}$)—CH$_2$—O—(CH$_2$)$_3$—, —O—CO—(CH$_2$)$_w$—, in which w is a number from the range 3–12, or is —O—C$_3$—C$_6$alkylene.

Among these, particularly important compounds of the formula I are those in which
n is a number from the range 1–100;
m is 0;
p is a number from the range 0–100; and
the sum n+p is a number from the range 3–100;
A is trimethylsilyloxy and B is trimethylsilyl; or A and B together, where the sum of the units of the formulae Ia and Ic is from 3 to 7, are a direct bond;
$R^1$, $R^2$ and $R^3$ are methyl;
$R^4$ is C–$C_{18}$alkyl or

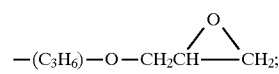

$R^5$ and $R^7$, independently of one another, are hydrogen or methyl;
$R^6$ is hydrogen, methyl or phenyl;
$R^8$ is as defined for $R^5$;
$R^9$ is as defined for $R^6$;

$R^{10}$ is as defined for $R^7$;
$R^{16}$ is hydrogen; and
—O—Z— is —O—$C_3$—$C_6$alkylene or —O—$CH_2$—CH(OH)—$CH_2$—O—$(CH_2)_3$—.

The novel compounds are advantageously prepared by reacting a suitable unsaturated compound of the formula IV

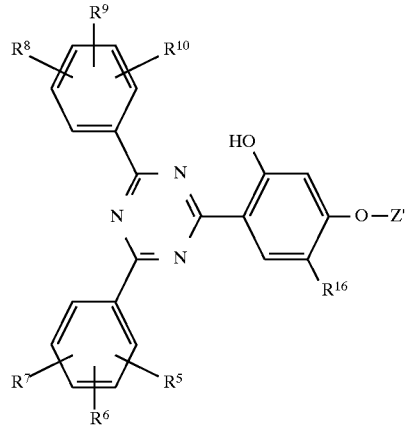

(IV)

with a Si-H-containing compound of the formula VI

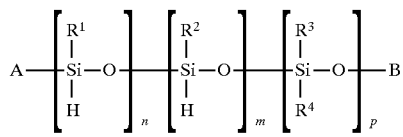

(VI)

in which Z' is of the formula —$(CH_2)_q$—O—$R^{23}$,

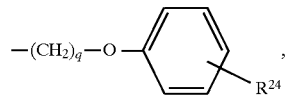

—$CH_2$—$CH(OR^{12})$—$CH_2$—O—$(CH_2)_{t-2}$—CH=$CH_2$,

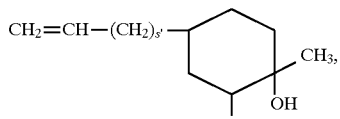

—CO—$(CH_2)_{w-2}$—CH=$CH_2$ or —$CH(R^2)$—CO—O—$(CH_2)_{w-2}$—CH=$CH_2$ or is $C_3$–$C_{18}$alkenyl;
R23 is $C_3$–$C_{12}$alkenyl or cyclohexenyl;
$R^{24}$ is $C_2$–C12alkenyl; and
s' is 0 or 1;
and the other symbols are as defined above.

n mol of the unsaturated compound of the formula IV are preferably employed per mole of the compound of the formula VI. It is also possible to attach the radicals $R^4$ and X to the siloxane chain in the same process step; in this case, for each mole of a compound of the formula VII

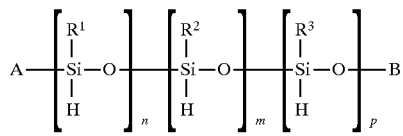

(VII)

it is expedient to employ n mol of the unsaturated compound of the formula IV together with p mol of an unsaturated compound VIII selected from $C_2$–$C_{18}$alkene, especially $C_3$–$C_{18}$alkene, $C_3$–$C_6$hydroxyalkene, $C_3$–$C_6$aminoalkene,

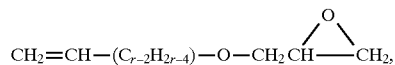

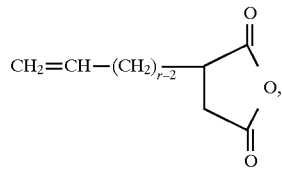

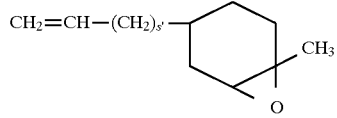

or

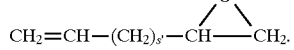

The symbols r and s' are as defined above.

The present invention provides compounds and/or mixtures of compounds obtainable by the above process.

Preferably, the ethylenically unsaturated unit in Z' (formula IV) or in compound VIII is terminal; for example, compound VIII as $C_8$alkene is preferably 1-octene.

The reaction is usually carried out in the presence of suitable catalysts, which may inter alia be noble metal catalysts such as platinum or rhodium catalysts, examples being $H_2PtCl_6$ or $PtCl_2(C_6H_5$—CH=$CH_2)_2$; the concentration of the catalyst is advantageously 1–1000 ppm (1–1000 equivalents per $10^6$ equivalents of Si—H).

The reaction can for example be carried out in appropriate aprotic organic solvents, for example in THF (tetrahydrofuran), dioxane, hexane, heptane, cyclohexane, toluene or xylene, or without the addition of solvents. The reaction temperature is advantageously in the range 20–150° C., preferably 80–130° C.

Alternatively, the compound of the formula VI can also be reacted first of all with a compound, acting as bridge member, of the formula

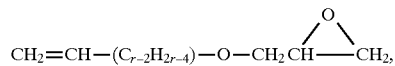

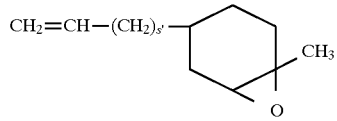

or

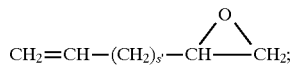

the reaction product can subsequently be reacted in a manner known per se with a compound of the formula IX

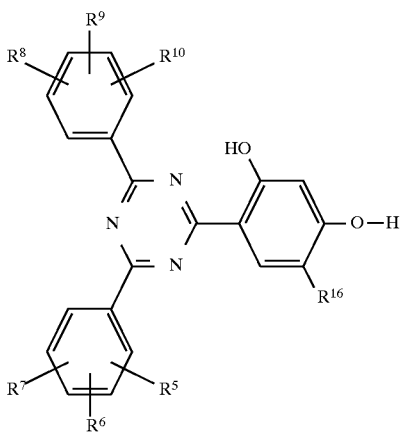 (IX)

to give the desired end product of the formula I or a corresponding crosslinked compound.

The starting compounds of the formulae IV, VI and VII are known compounds which can be prepared, for example, in accordance with EP-A-434 608 or the abovementioned U.S. Pat. No. 5,102,707 or analogously to methods mentioned therein. Many of these starting compounds are available commercially.

The novel compounds can be used with advantage as stabilizers for organic material, especially organic polymers, against damage thereto by light, oxygen and heat The invention therefore also provides a method of stabilizing organic material against damage by light, oxygen and heat, which comprises admixing to this material at least one compound of the formula I or a corresponding crosslinked compound, and provides for the use of these compounds as stabilizers for organic material against damage by light, oxygen and heat.

The invention additionally provides a composition comprising

A) an organic material which is sensitive to damage by light, oxygen and/or heat, in particular an organic polymer, and B) as stabilizer, a compound of the formula I or a correspondingly crosslinked compound.

Use in polymeric materials as are present in plastics, rubbers, coating materials or adhesives, is of particular interest. Examples of polymers to be stabilized according to the invention are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for example of cyclopentene or norbornene; furthermore polyethylene (which optionally can be crosslinked), for example high density polyethylene (HDPE), high density polyethylene of high molecular mass (HDPE-HMW), high density polyethylene of ultra-high molecular mass (HDPE-UHMW), medium density polyethylene (MDPE), low density polyethylene (LDPE), linear low density polyethylene (LLDPE), branched low density polyethylene (BLDPE).

Polyolefins, i.e. polymers of monoolefins exemplified in the preceding paragraph, in particular polyethylene and polypropylene, can be prepared by different, and especially by the following, methods:

a) radical polymerization (normally under high pressure and at elevated temperature)

b) catalytic polymerization using a catalyst that normally contains one or more metals of group IVb, Vb, VIb or VIII. These metals usually have one or more ligands, such as oxides, halides, alcoholates, esters, ethers, amines, alkyls, alkenyls and/or aryls that may be either π- or σ-coordinated. These metal complexes may be in the free form or fixed on substrates, for example on activated magnesium chloride, titanium(III) chloride, alumina or silicon oxide. These catalysts may be soluble or insoluble in the polymerization medium. The catalysts can be active as such in the polymerization or further activators may be used, for example metal alkyls, metal hydrides, metal alkyl halides, metal alkyl oxides or metal alkyloxanes, the metals being elements of groups Ia, IIa and/or IIIa. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene-propylene copolymers, linear low density polyethylene (LLDPE) and its mixtures with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide or ethylene-acrylic copolymers and their salts (ionomers) and well as terpolymers of ethylene with propylene and a diene, such as hexadiene, dicyclopentadiene or ethylidene-norbornene; and mixtures of such copolymers with one another and with polymers mentioned under 1), for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene-carbon monoxide copolymers and mixtures thereof with other polymers, for example polyamides.

4. Hydrocarbon resins (for example $C_5$–$C_0$) including hydrogenated modifications thereof (e.g. tackifier resins) and mixtures of polyalkylenes and starch.

5. Polystyrene, poly-(p-methylstyrene), poly-(α-methylstyrene).

6. Copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures of high impact strength of styrene copolymers and another polymer, for example a polyacrylate, a diene polymer or an ethylene-propylene-diene terpolymer; and block copolymers of styrene such as styrene-butadiene-styrene, styrene-isoprene-styrene, styrene-ethylene-butylene-styrene or styrene-ethylene-propylene-styrene.

7. Graft copolymers of styrene or α-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-propylene-diene terpolymers, styrene and acrylo-nitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers, such as polychloroprene, chlorinated rubber, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from α,β,-unsaturated acids and derivatives thereof, such as polyacrylates and polymethacrylates, polyacrylonitriles, polyacrylamides and polymethyl methacrylates impact-modified with butyl acrylate.

10. Copolymers of the monomers mentioned under 9) with each other or with other unsaturated monomers, for example acrylonitrile-butadiene copolymers, acrylonitrile-alkyl acrylate copolymeres, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in point 1.

12. Homopolymers and copolymers of cyclic ethers, such as polyalkylene glycols, polyethylene oxide, polypropylene oxide or copolymers thereof with bisglycidyl ethers.

13. Polyacetals, such as polyoxymethylene and those polyoxymethylenes which contain comonomers, for example ethylene oxide; polyacetals modified with thermoplastic polyurethanes, acrylates or MBS.

14. Polyphenylene oxides and sulfides, and mixtures thereof with styrene polymers or polyamides.

15. Polyurethanes derived from hydroxyl-terminated polyethers, polyesters and poly-butadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. Also, polyamides or copolyamides modified with EPDM or ABS; and polyamides condensed during processing (RIM polyamide systems).

17. Polyureas, polyimides, polyamide-imides, polyether imides, polyester imides, polyhydontoins and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenolformaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols, and vinyl compounds as crosslinking agents, and also halogen-containing modifications thereof of low flammability.

24. Crosslinkable acrylic resins, derived from substituted acrylates, for example from epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, for example products of bisphenol-A diglycidyl ethers, bisphenol-F diglycidyl ethers, which are crosslinked by means of customary hardeners, such as anhydrides or amines, with or without accelerators.

27. Natural polymers, such as cellulose, natural rubber, gelatin and derivatives thereof which have been chemically modified in a polymer-homologous manner, for example cellulose acetates, cellulose propionates and cellulose butyrates, or the cellulose ethers, such as methyl cellulose as well as rosins and derivatives.

28. Blends (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The quantity of stabilizer added according to the invention depends on the respective substrate and on its intended use. Quantities of from 0.01 to 5 % by weight are generally sufficient, with preference being given to the use of from 0.05 to 3 % by weight relative to the polymer to be stabilized. Therefore, polymers which are particularly in accordance with the invention are those comprising from 0.01 to 5 % by weight, especially from 0.05 to 3 % by weight, of at least one compound of the formula I and/or a correspondingly crosslinked compound.

In certain cases it may be advantageous to use two or more of the compounds according to the invention. The compositions according to the invention can, furthermore, in addition to the novel stabilizer also comprise other stabilizers or other additives, for example antioxidants, further light stabilizers, metal deactivators, phosphites or phosphonites. Examples of these are the following classes of compounds:

1. Antioxidants 1.1. Alkylated monophenols, for example 2,6-di-tert-butyl-4-methylphenol, 2-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols which are branched in the side chain, such as 2,6-di-nonyl-4-methylphenol, 2,4-dimethyl-6-(1-methylundec-1'-yl)phenol, 2,4-dimethyl-6-(1'-methylheptadec-1'-yl)phenol, 2,4-di-methyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3 Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl4-octa-decyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methly-phenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-di-methyl-4-hydroxyphenyl)disulfide.

1.6. Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methyl-cyclohexyl)phenol], 2,2-methylenebis(4-methyl-6-cyclohexylphenol), 2,2'-methylenebis-(6-nonyl-4-methylphenol), 2,2'-methylenebis(4,6-di-tert-butylphenol), 2,2'-ethylidenebis-(4,6-di-tert-butylphenol), 2,2'-ethylidenebis(6-tert-butyl-4-isobutylphenol), 2,2'methy-lenebis[6-(α-methylbenzyl)-4-nonylphenol], 2,2'-methylenebis[6-(α,αdimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis-(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)-butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis-(3,5-dimethyl-2-hydroxyphenyl)butane, 2,2-bis(3,5-di-tert-butyl-4-hydroxyphenyl)-propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-di-hydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis (3,5-di-tert-butyl-4-hydroxybenzyl) sulfide, isooctyl 3,5-di-tert-butyl-4-hydroxybenzylmercaptoacetate.

1.8 Hydroxylated malonates, for example dioctadecyl 2,2-bis(3,5-di-tert-butyl-2-hydroxy-benzyl)malonate, dioctadecyl 2-(3-tert-butyl-4-hydroxy-5-methylbenzyl) malonate, di-dodecyl mercaptoethyl-2,2-bis(3,5-di-tert-butyl-4-hydroxybenzyl)malonate, di-[4-( 1,1,3,3-tetramethylbutyl)phenyl] 2,2-bis(3,5-di-tert-butyl-4-hydroxybenzyl)-malonate.

1.9 Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris (3,5-di-tert-butyl-4-hydroxybenzyl)phenol.

1.10. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxy-anilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl) isocyanurate, 1,3,5-tris(4-tert-butyl-3-hydroxy-2,6-di-methylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.11. Benzyiphosphonates, for example dimethyl 2,5-di-tert-butyl-4-hydroxybenzyl-phosphonate, phosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4hydroxy-3-methyl- benzylphosphonate, the calcium salt of the monoethyl ester of 3,5-di-tert-butyl-4-hydroxy-benzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) pronionic acid, with mono- or poly-hydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl- 1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxylhenyl) prolionic acid with mono- or poly-hydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16 Esters of 3,5-di-tert-butyl-4-hydroxyphenvl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1 -phospha-2,6,7-trioxabicyclo[2.2.2]octane.

1.17. Amides of β-(3,5-di-tert-butyl-4-hydroxyphenyl) propionic acid, e.g. N,N'-bis-(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18 Ascorbic acid (vitamin C).

1.19. Aminic antioxidants, e.g. N,N'-di-isopropyl-p-phenylenediamine, N,N'-di-sec-butyl-p-phenylenediamine, N,N'-bis(1,4-dimethylpentyl)-p-phenylenediamine, N,N'-bis-(1-ethyl-3-methylpentyl)-p-phenylenediamine, N,N'-bis(l-methylheptyl)-p-phenylene-diamine, N,N'-dicyclohexyl-p-phenylenediamine, N,N'-diphenyl-p-phenylenediamine, N,N'-di-(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluene-sulfonamido)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di-(4-methoxyphenyl)amine, 2,6-di-tert-butyl-4-dimethyl-aminomethylphenol, 2,4'-diaminodiphenylmethane, 4,4'-diaminodiphenylmethane, N,N,N',N'-tetramethyl-4,4'-diamino-diphenylmethane, 1,2-di-[(2-methylphenyl)-amino]-ethane, 1,2-di-(phenylamino)propane, (o-tolyl) biguanide, di-[4-(1',3'-dimethyl-butyl)phenyl]amine, tert-octylated N-phenyl-1-naphthylamine, a mixture of mono- and dialkylated tert-butyl/tert-octyldiphenylamines, a mixture of mono- and dialkylated nonyl-diphenylamines, mixtures of mono- and dialkylated dodecyldiphenylamines, a mixture of mono- and dialkylated isopropylisohexyl-diphenylamines, a mixture of mono- and dialkylated tert-butyldiphenylamines, 2,3-dihydro-3,3-dimethyl-4H-1,4-benzothiazine, phenothiazine, mixtures of mono- and dialkylated tert-butyl/tert-octyl-phenothiazines, mixtures of mono- and dialkylated tert-octyl-phenothiazines, N-allylphenothiazine, N,N,N',N'-tetraphenyl-1,4-diaminobut-2-ene, N,N-bis(2,2,6,6-tetramethylpiperidin-4-yl) hexamethylenediamine, bis(2,2,6,6-tetramethylpiperidin-4-yl)sebacate, 2,2,6,6-tetra-methylpiperidin4-one, 2,2,6,6-tetramethylpiperidin-4-ol.

2. Uv absorbers and light stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, a mixture of 2-(3'-tert-butyl-2'-hydroxy-5'-(2-octyloxy-carbonylethyl)phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy- 5'-(2-methoxycarbonylethyl)phenyl)benzotriazole, 2-(3'-tert-butyl-2'-hydroxy-5'-(2-octyl-oxycarbonylethyl) phenyl)benzotriazole, 2-(3'-tert-butyl-5'-[2-(2-ethylhexyloxy)carbonyl-ethyl]-2'-hydroxyphenyl) benzotriazole, 2-(3'-dodecyl-2'-hydroxy-5'-methylphenyl)benzo-triazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-yl-phenol]; the transesterification product of 2-[3'-tert-butyl-5'-(2-methoxycarbonylethyl)-2'-hydroxy-phenyl] benzotriazole with polyethylene glycol 300; [R—CH$_2$CH$_2$—COO(CH$_2$)$_3$]$_2$—where R=3'-tert-butyl-4'-hydroxy-5'-2H-benzotriazol-2-ylphenyl.

2.2. 2-Hydroxybenzophenones, for example the 4-hydroxy, 4-methoxy, 4-octoxy, 4-decyl-oxy, 4-dodecyloxy, 4-benzyloxy, 4,2',4'-trihydroxy and 2'-hydroxy-4,4'-dimethoxy derivative.

2.3. Esters of substituted or unsubstituted benzoic acids, for example 4-tert-butylphenyl salicylate, phenyl salicylate, octylphenyl salicylate, dibenzoylresorcinol, bis(4-tert-butyl-benzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate or isooctyl α-cyano-β,β-diphenylacrylate, methyl α-carbomethoxycinnamate, methyl α-cyano-β-methyl-p-methoxy-cinnamate or butyl α-cyano-β-methyl-p-methoxycinnamate, methyl αcarbomethoxy-p-methoxycinnamate and N-(α-carbomethoxy-α-cyanovinyl)-2-methylindoline.

2.5 Nickel compounds, for example nickel complexes of 2,2'-thiobis-[4-(1,1,3,3-tetra-methylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6. Sterically hindered amines, for example bis(2,2,6,6-tetramethylpiperidin-4-yl) sebacate, bis(2,2,6,6-tetramethylpiperidin-4-yl) succinate, bis(1,2,2,6,6-pentamethyl-piperidin-4-yl) sebacate, bis(1-octyloxy-2,2,6,6-tetramethylpiperidin-4-yl) sebacate, bis(1,2,2,6,6-pentamethylpiperidyl) n-butyl-3,5-di-tert-butyl-4-hydroxybenzylmalonate, the condensate of 1-hydroxyethyl-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro- 1,3,5-s-triazine, tris(2,2,6,6-tetramethyl-4-piperidyl) nitrilotriacetate, tetrakis(2,2,6,6-tetramethyl-4-piperidyl)- 1,2,3 ,4-butanetetraoate, 1,1 '-(1,2-ethanediyl)bis(3,3,5,5-tetramethylpiperazinone), 4-benzoyl-2,2,6,6-tetramethyl-piperidine, 4-stearyloxy-2,2,6,6-tetramethylpiperidine, bis(1,2,2,6,6-penta-methylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis (1-octyloxy-2,2,6,6-tetra-methylpiperidyl) sebacate, bis(1-octyloxy-2,2,6,6-tetramethylpiperidyl) succinate, the condensate of N,N'-bis(2,2,6,6-tetramethyl-4-piperidyl)hexamethylenediamine and 4-morpholino-2, 6-dichloro-1,3,5-triazine, the condensate of 2-chloro-4,6-di-(4-n-butyl-amino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethyl-piperidyl)-1,3,5-triazine and 1,2-bis(3-aminopropylamino)ethane, 8-acetyl-3-dodecyl-7,7,9,9-tetramethyl- 1,3,8-triazaspiro[4.5]decane-2,4-dione, 3-dodecyl- 1-(2,2,6,6-tetra-methyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, the condensation product of N,N'-bis(2,2,6,6-tetramethyl-4-piperidyl)hexamethylenediamine and 4-cyclohexylamino-2,6-dichloro-1,3,5-triazine, the condensation product of 1,2-bis(3-aminopropylamino) ethane and 2,4,6-trichloro-1,3,5-triazine and also 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetra-methyl-1-oxa-3,8-diaza-4-oxospiro[4,5]decane, the reaction product of 7,7,9,9-tetramethyl-2-cycloundecyl-1-oxa-3,8-diaza-4-oxospiro[4, 5]decane and epichlorhydrin.

2.7. Oxalamides, for example 4,4'-dioctyloxyoxanilide, 2,2'-diethoxyoxanilide, 2,2'-di-octyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy and of o-and p-ethoxy-disubstituted oxanilides.

2.8. 2-(2-Hydroxyphenyl)-1,3,5-triazines, for example 2,4,6-tris(2-hydroxy-4-octyloxy-phenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2, 4-dimethylphenyl)- 1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2, 4-dimethylphenyl)-1,3,5-triazine, 2-(2-hydroxy-4-tridecyl-oxyphenyl)-4,6-bis(2,4-dimethylphenyl)-1,3, 5-triazine, 2-[2-hydroxy-4-(2-hydroxy-3-butyloxypropyloxy)phenyl]-4,6-bis(2,4-dimethylphenyl)- 1,3,5-triazine, 2- [2-hydroxy-4-(2-hydroxy-3-octyloxypropyloxy)phenyl]-4,6-bis(2,4-dimethylphenyl)- 1,3,5-triazine, 2-[4-(dodecyloxy/tridecyloxy-2-hydroxypropoxy)-2-hydroxyphenyl]-4, 6-bis(2,4-dimethyl-phenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris-[2-hydroxy-4-(3-butoxy-2-hydroxypropoxy)phenyl]-1,3,5-triazine, 2-(2-hydroxyphenyl)-4-(4-methoxyphenyl)-6-phenyl-1 ,3,5-triazine.

3. Metal deactivators, for example N,N'-diphenyloxalamide, N-salicylal-N'-salicyloyl-hydrazine, N,N'-bis(salicyloyl)hydrazine, N,N'-bis(3,5-di-tert-butyl-4-hydroxyphenyl-propionyl)hydrazine, 3-salicyloylamino-1,2,4-triazole, bis(benzylidene) oxalyl dihydrazide, oxanilide, isophthaloyl dihydrazide, sebacoyl bisphenyl hydrazide, N,N'-diacetyladipoyl dihydrazide, N,N'-bis(salicyloyl)oxalyl dihydrazide, N,N'-bis(salicyloyl)-thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis (2,4-di-tert-butylphenyl)penta-erythritol diphosphite, bis(2,6-di-tert-butyl-4-methylphenyl)pentaerythritol diphosphite, bisisodecyloxypentaerythritol diphosphite, bis(2,4-di-tert-butyl-6-methylphenyl) penta-erythritol diphosphite, bis(2,4,6-tri-tertbutylphenyl)pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl- 12H-dibenzo[d,g]- 1,3,2-dioxaphosphocin, 6-fluoro-2,4,8,10-tetra-tert-butyl-12-methyl-dibenzo[d,g]- 1,3,2-dioxaphosphocin, bis(2,4-di-tert-butyl-6-methylphenyl) methyl phosphite, bis (2,4-di-tert-butyl-6-methyl-phenyl) ethyl phosphite.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxyl-amine from hydrated tallow fatty amines.

6. Nitrones, for example N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrones derived from N,N-dialkylhydroxylamines prepared from hydrated tallow fatty amines.

7. Thiosynergists, for example dilauryl thiodipropionate ester or distearyl thio-dipropionate.

8. Peroxide scavengers, for example esters of P-thiodipropionic acid, for example lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium stearate, sodium ricinoleate, potassium palmitate, antimony pyrocatecholate or tin pyrocatecholate.

11. Nucleating agents, for example ionorganic substances, for example, talc, metal oxides such as titanium dioxide or magnesium oxide, phosphates, carbonates or sulfates of preferably alkaline earth metals; organic compounds such as mono- or polycarboxylic acids and their salts, for example 4-tert-butylbenzoic acid, adipic acid, diphenylacetic acid, sodium succinate or sodium benzoate; polymeric compounds, for example ionic copolymers ("ionomers").

12. Fillers and reinforcing agents, for example calcium carbonate, silicates, glass fibres, glass beads, asbestos, talc, kaolin, mica, barium sulfate, metal oxides and hydroxides, carbon black, graphite, wood flour, and flours or fibres of other natural products, synthetic fibres.

13. Other additives, for example plasticizers, lubricants, emulsifiers, pigments, rheology additives, catalysts, levelling auxiliaries, fluorescent brighteners, fire-retarding agents, antistatic agents and blowing agents.

14. Benzofuranones and indolinones, for example those disclosed in U.S. Pat. No. 4,325,863, U.S. Pat No. 4,338,244, U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy] phenyl)benzofuran-2-one], 5,7-di-tert-butyl-3-(4-ethoxy-phenyl)benzofuran-2-one, 3-(4-acetoxy-3,5-dimethylphenyl)-5,7-di-tert-butyl-benzo-furan-2-one, 3-(3,5-dimethyl-4-pivaloyloxyphenyl)-5,7-di-tert-butyl-benzofuran-2-one.

The nature and quantity of the further stabilizers added is determined by the nature of the substrate to be stabilized and on its intended use; it is common to use from 0.1 to 5% by weight, based on the material to be stabilized.

In addition to components A and B, the novel composition preferably comprises as component C a light stabilizer from the class of the sterically hindered amines, the 2-(2-hydroxyphenyl)-1,3,5-triazines and/or the 2-hydroxyphenyl-2H-benzotriazoles. Examples of such co-stabilizers can be found in the above list under items 2.1, 2.6 and 2.8.

In order to obtain maximum light stability it is particularly advantageous to add sterically hindered amines as cited in the above list under 2.6. A composition which in addition to components A and B comprises, as component C, a light stabilizer from the class of the sterically hindered amines (HALS) is therefore particularly preferred.

The light stabilizer involved in this case is preferably a 2,2,6,6-tetraalkylpiperidine derivative containing at least one group of the formula

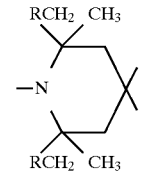

in which R is hydrogen or methyl, especially hydrogen.

The novel compounds can be used to particular advantage in compositions comprising as component A an organic polymer, for example a synthetic polymer, especially a thermoplastic organic polymer, or a binder for coatings, such as, for example, surface coatings or a photographic material.

When component A is a binder for coatings, the addition of the above-described component C to the novel composition is particularly advisable.

Other compositions of interest are those in which component (A) is a polyolefin, for example polyethylene or polypropylene.

Incorporation into the organic material to be stabilized, for example into the synthetic organic, especially thermoplastic polymers, can be effected by adding the novel compounds and, if desired, further additives in accordance with methods which are customary in the art. Incorporation can expediently be effected prior to or during shaping, for example by mixing the pulverulent components or by adding the stabilizer to the melt or solution of the material to be stabilized, or by applying the dissolved or dispersed compounds to the material to be stabilized, with or without subsequent evaporation of the solvent. In the case of elastomers, these can also be stabilized as lattices. Another option for incorporating the novel compounds into polymers consists in their addition prior to or during the polymerization of the corresponding monomers and/or prior to crosslinking.

The novel compounds or mixtures thereof can also be added in the form of a masterbatch comprising these compounds in a concentration, for example, of from 2.5 to 25% by weight to the polymers to be stabilized.

The incorporation of the novel compounds can expediently be effected in accordance with the following methods:
- as emulsion or dispersion (e.g. to lattices or emulsion polymers)
- as a dry mixture during the mixing of additional components or polymer mixtures
- by direct addition to the processing apparatus (e.g. extruders, internal mixers, etc.)
- as a solution or melt.

The resulting stabilized polymer compositions can be converted into shaped articles by the customary methods, for example by hot pressing, spinning, extrusion or injection moulding, examples of these articles being fibres, films, strips, plates, sandwich plates, vessels, pipes and other profiles.

The invention consequently also provides for the use of the novel polymer composition for the production of a shaped article.

Particular preference is given to the use of the novel compounds as stabilizers in coating compositions, for example in coating materials of any type. This also means a process in accordance with the above description, in which the organic material is a binder for a coating material. The coating materials may be pigmented or unpigmented coatings or metallic effect paints. They may contain an organic solvent or may be solvent-free, or may be aqueous coating materials.

Use in multicoat systems is possible, the concentration of the novel compound (component B) in the topcoat possibly being relatively high, for example from 1 to 15 parts by weight of B, especially 3–10 parts by weight of B, per 100 parts by weight of solid binder A.

Suitable binders (component A) are in principle all those which are customary in the art, for example those as described in Ullmann's Encyclopedia of Industrial Chemistry, 5th edition, Vol. A18, pp. 368–426, VCH, Weinheim 1991. The binder is in general a film-forming binder based on a thermoplastic or thermosetting resin, predominantly on a thermosetting resin. Examples hereof are alkyd, acrylic, polyester, phenolic, melamine, epoxy and polyurethane resins and mixtures thereof.

Component A can be a cold-curable or a hot-curable binder, in which case the addition of a curing catalyst may be advantageous. Suitable catalysts which accelerate the curing of the binder are described, for example, in Ullmann's Encyclopedia of Industrial Chemistry, Vol. A 18, p. 469, VCH Verlagsgesellschaft, Weinheim 1991.

Preferred coating compositions are those in which component A is a binder comprising a functional acrylate resin and a crosslinking agent.

Examples of coating compositions containing specific binders are the following:
1. coatings based on cold- or hot-crosslinkable alkyd, acrylate, polyester, epoxy or melamin resins or mixtures of such resins, where appropriate with the addition of a curing catalyst;
2. two-component polyurethane coatings based on hydroxyl-containing acrylate, polyester or polyether resins and aliphatic or aromatic isocyanates, isocyanurates or polyisocyanates;
3. one-component polyurethane coatings based on blocked isocyanates, isocyanurates or polyisocyanates, which are unblocked during stoving;
4. two-component coatings based on (poly)ketimines and aliphatic or aromatic isocyantes, isocyanurates or polyisocyanates;
5. two-component coatings based on (poly)ketimines and an unsaturated acrylate resin or a polyacetoacetate resin or a methacrylamidoglycolate methyl ester;
6. two-component coatings based on carboxyl- or amino-containing polyacrylates and polyepoxides;
7. two-component coatings based on acrylate resins containing anhydride groups and on a polyhydroxy or polyamino component;
8. two-component coatings based on (poly)oxazolines and on acrylate resins containing anhydride groups or on unsaturated acrylate resins or aliphatic or aromatic isocyanates, isocyanurates or polyisocyantes;
9. two-component coatings based on unsaturated polyacrylates and polymalonates;
10. thermoplastic polyacrylate coatings based on thermoplastic acrylate resins or on externally crosslinking acrylate resins in combination with etherified melamine resins;
11. coating systems based on siloxane-modified acrylate resins;
12. coating systems based on fluorine-modified acrylate resins, and
13. coating systems based on allyl glycidyl ethers.

The novel coating compositions can also be radiation-curable coating compositions. In this case the binder consists essentially of monomeric or oligomeric compounds having ethylenically unsaturated bonds, which are cured, i.e. converted into a high molecular weight crosslinked form, after application by irradiation with UV or electron beams. It is common to employ photoinitiators such as, for example, benzophenone, benzophenone derivatives, acetophenone, acetophenone derivatives, for example α-hydroxycycloalkyl phenyl ketones, dialkoxyacetophenones, α-hydroxy- or α-aminoacetophenones, 4-aroyl-1,3-dioxolanes, benzoin alkyl ethers and benzil ketals, monoacylphosphine oxides, bisacylphosphine oxides, ferrocenes or titanocenes. Appropriate systems are described in the abovementioned publication, Ullmann's Encyclopedia of Industrial Chemistry, 5th edition, Vol. A18, pages 451–453. In radiation-curable coating compositions it is possible for the novel compounds to be employed even without the addition of sterically hindered amines.

In addition to components A, B and, if appropriate, C, the coating composition can also comprise further components, examples being solvents, pigments, dyes, plasticizers, stabilizers, thixotropic agents, drying catalysts and/or levelling auxiliaries. Examples of possible components are those described in Ullmann's Encyclopedia of Industrial Chemistry, 5th edition, Vol. A18, pp. 429–471, VCH, Weinheim 1991.

Examples of possible drying catalysts or curing catalysts are organic metal compounds, amines, amino-containing resins and/or phosphines. Examples of organic metal compounds are metal carboxylates, especially those of the metals Pb, Mn, Co, Zn, Zr or Cu, or metal chelates, especially those of the metals Al, Ti or Zr, or organometallic compounds, for example organotin compounds.

Examples of metal carboxylates are the stearates of Pb, Mn or Zn, the octoates of Co, Zn or Cu, the naphthenates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate and the alkoxides of these metals.

Examples of organotin compounds are dibutyltin oxide, dibutyltin dilaurate or dibutyltin dioctoate.

Examples of amines are, in particular tertiary amines such as, for example, tributylamine, triethanolamine, N-methyldiethanolamine, N-dimethylethanolamine, N-ethylmorpholine, N-methylmorpholine or diazabicyclooctane (triethylenediamine) and salts thereof. Other examples are quaternary ammonium salts, such as trimethylbenzylammonium chloride.

Amono-containing resins are simultaneously binder and curing catalyst. Examples hereof are amino-containing acrylate copolymers.

As curing catalyst it is also possible to use phosphines, for example triphenylphosphine.

The novel coating compositions can be applied to any desired substrates, for example to metal, wood, plastic or ceramic materials. They are preferably used as topcoat in the finishing of automobiles. Where the topcoat consists of two coats of which the lower coat is pigmented and the upper coat is not, the novel coating composition can be used for the upper or for the lower coat or for both coats, but preferably for the upper coat.

The novel coating compositions can be applied to the substrates by the customary methods, for example by brushing, spraying, flow coating, dipping or electrophoresis; see also Ullmann's Encyclopedia of Industrial Chemistry, 5th edition, Vol. A18, pp. 491–500.

Depending on the binder system, the coatings can be cured at room temperature or by heating. The coatings are preferably cured at 50°–150° C., and power coatings can be cured at even higher temperatures.

The coatings obtained in accordance with the invention exhibit an outstanding resistance to damaging effects of light, oxygen and heat; reference should be made in particular to the good light stability and weathering resistance of the resulting coatings, for example surface-coating materials.

The invention therefore also relates to a coating, in particular a surface coating, which is stabilized by containing a proportion of the novel compound against damaging effects of light, oxygen and heat. The surface-coating material is preferably a topcoat for cars.

The coating materials can be applied as one-coat or two-coat finishes, the novel stabilizers preferably being added to the unpigmented, uppermost coat.

The coating materials can be applied to the substrates (metal, plastic, wood, etc.) by the customary methods, for example by brushing, spraying, pouring, dipping or electrophoresis.

The coating compositions usually comprise an organic solvent or solvent mixture in which the binder is soluble. However, the coating composition can also be an aqueous solution or dispersion. The vehicle can also be a mixture of an organic solvent and water. The solvent can also be a high-solids coating material or can be solvent-free (power coating).

The pigments can be inorganic, organic or metallic pigments. The novel coating compositions preferably contain no pigments and are used as clearcoat.

The examples which follow describe the implementation of the invention in more detail, without wishing to restrict this invention to the examples. In the examples, parts and percentages are by weight unless specified otherwise. Among the abbreviations used, MW denotes molecular weight (molecular mass; g/mol)=$M_n$; $M_n$ denotes the numerical average of the molecular mass; $M_w$ denotes the mass average of the molecular mass; and GPC denotes gel permeation chromatography. In the case of products for which only an empirical structural formula can be given, calculated percentages in elemental analyses are based on the formula derived from $^1$H-NMR data.

A) Preparation of starting compounds

A1) Preparation of polymethyl (3-glycidyloxypropyl) siloxane 4.0 g of polymethylhydridosiloxane (MW=400 g/mol) are added dropwise with stirring over the course of 1 h to a mixture of 11.4 g (100 mmol) of allyl glycidyl ether and 20 mg (0.05 mmol) of $PtCl_2$(styrene) complex, which is maintained under nitrogen at 100° C. The mixture is subsequently held at 100° C. with stirring for 10 h. After cooling and dilution with toluene, the solution is purified by filtration through a little silica gel. Concentration of the filtrate gives 4.1 g of a compound with the empirical formula

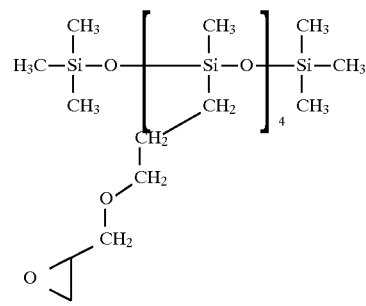

as a colourless liquid; epoxide number: calculated 4.64 mol/kg; found 4.47 mol/kg.

A2) Preparation of methyloctyl (3-glycidyloxypropyl) siloxane copolymer 20.0 g (0.05 mol) of polymethylhydridosiloxane (MW=400 g/mol) are added with stirring over the course of 2 h to a mixture of 11.4 g (100 mmol) of allyl glycidyl ether and 5 mg (0.013 mmol) of $PtCl_2$(styrene) complex which is maintained under nitrogen at 100° C. The mixture is maintained at 100° C. with stirring for 6 h, and then 11.2 g (0.1 mol) of 1-octene are added and the mixture is held at 100° C. for a further 20 h. After cooling, the solution is purified by filtration through a little silica gel. Concentration of the filtrate gives 25.8 g of a compound of the average formula (based on $^1$H-NMR)

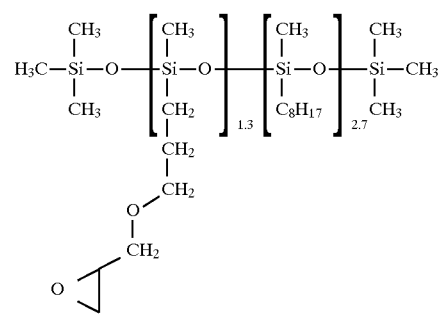

as a colourless liquid; epoxide number: calculated 1.52 mol/kg; found 1.60 mol/kg.

A3) In accordance with the method described under A2) and using correspondingly amended quantities of starting compounds, a compound of the average formula (based on $^1$H-NMR)

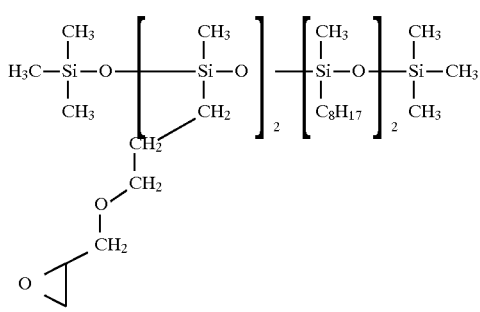

is obtained as a colourless liquid.

B) Preparation of novel siloxane compounds

B1) 3.0 g of polymethylhydridosiloxane (MW=400 g/mol) are added dropwise with stirring over the course of 2 h to a mixture of 15.0 g (37.9 mmol) of 2-(2-hydroxy-4-butenyloxyphenyl)-4,6-diphenyl-1,3,5-triazine and 2.5 mg (0.0067 mmol) of PtCl$_2$(styrene) complex in 70 ml of toluene which is maintained under nitrogen at 100° C. The mixture is subsequently maintained at reflux temperature with stirring for 10 h.

Then 20 g (178 mmol) of 1-octene are added and heating is continued at reflux for a further 24 h. After cooling and concentration the residue is purified by chromatography (silica gel; gradient from 6:4 peteroleum ether/toluene to 4:1 toluene/ethyl acetate). 4.4 g of a compound of the formula

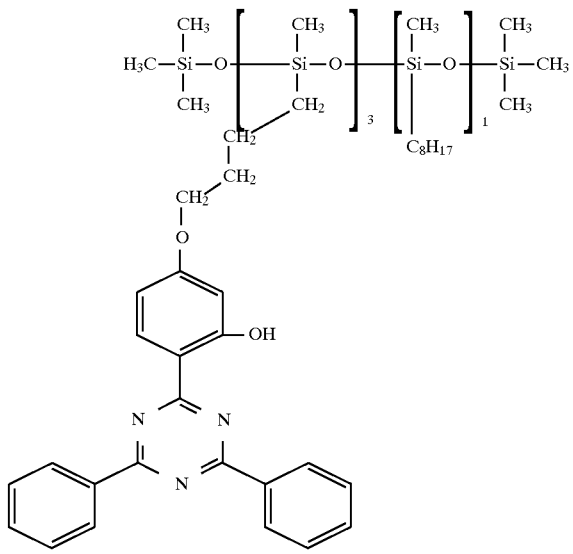

(average composition based on $^1$H-NMR) are obtained as a yellowish resin of molecular weight M$_n$=2,400 g/mol (GPC).

| Elemental analysis | % C | % H | % N | % Si |
|---|---|---|---|---|
| calculated | 65.86 | 6.71 | 7.43 | 9.94 |
| found | 63.08 | 6.27 | 7.28 | 11.07 |

B2) A solution of 1.0 g (1.16 mmol) of polymethyl(3-glycidyloxypropyl)siloxane (compound from A1), 0.8 g (2.32 mmol) of 2-(2,4-dihydroxyphenyl)-4,6-diphenyl-1,3,5-triazine and 40 mg (0.124 mmol) of tetrabutylammonium bromide in 10 ml of xylene is maintained at 120° C. under nitrogen with stirring for 24 h. After cooling and concentration, the residue is purified by chromatography (silica gel; gradient from toluene to ethyl acetate). 0.9 g of a compound of the formula

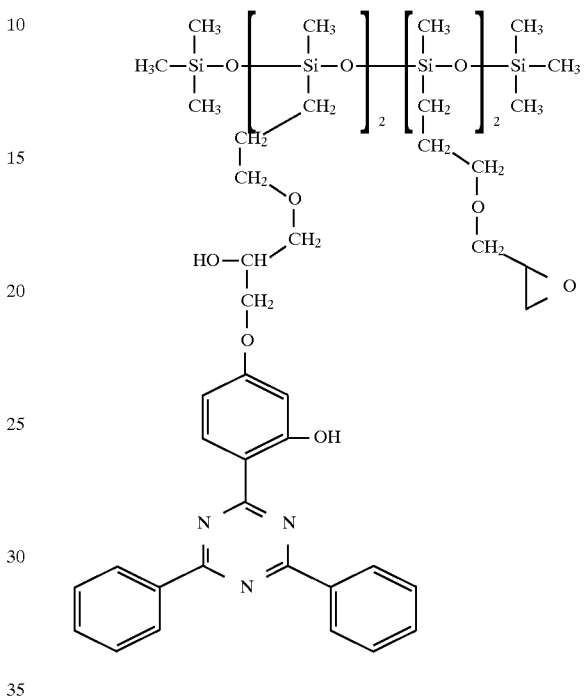

(average composition based on $^1$H-NMR) is obtained as a yellowish resin.

| Elemental analysis | % C | % H | % N | % Si |
|---|---|---|---|---|
| calculated | 59.19 | 6.80 | 5.45 | 10.93 |
| found | 58.45 | 6,63 | 5.35 | 10.80 |

B3) 8.0 g (20 mmol) of polymethylhydridosiloxane (MW=400 glmol) are added dropwise with stirring over the course of 1 h to a solution of 13.1 g (30 mmol) of 2-(4-allyloxy-2-hydroxyphenyl)-4,6-di(2,4-dimethylphenyl)-1,3,5-triazine and 3 mg (0.008 mmol) of PtCl$_2$(styrene) complex in 50 ml of toluene which is maintained under nitrogen at 100° C. The mixture is maintained at 100° C. with stirring for 12 h. Then 30 g (267 mmol) of 1-octene are added and the mixture is maintained at 100° C. for a further 24 h. After cooling to 20°–25° C., bleaching earth (Prolith Rapid®; manufacturer Caffaro, Milan/IT) is added and the mixture is filtered. Concentration gives 22.9 g of a compound of the average formula (based on $^1$H-NMR)

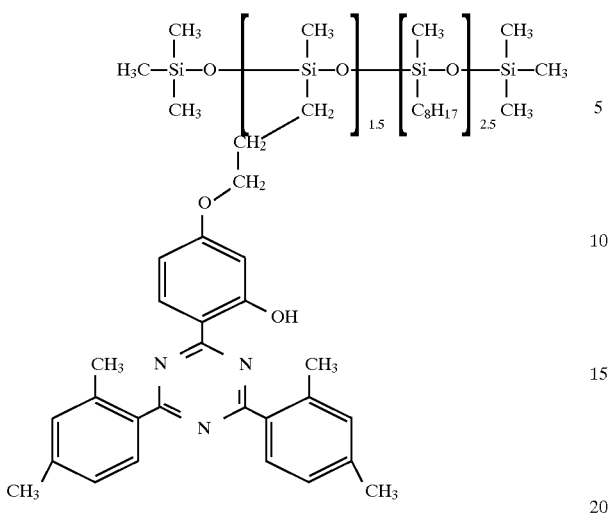

as a yellowish resin ($M_n$=1,350 g/mol, $M_w$=2,100 g/mol; determined by GPC).

B4) 4.5 g (3 mmol) of polymethylhydridosiloxane (MW =1,500 g/mol) are added dropwise with stirring over the course of 1 h to a solution of 13.1 g (30 mmol) of 2-(4-allyloxy-2-hydroxyphenyl)-4,6-bis(2,4-dimethylphenyl)-1,3,5-triazine and 3 mg (0.008 mmol) of $PtCl_2$(styrene) complex in 50 ml of toluene which is maintained under nitrogen at 80° C. The mixture is maintained at 80° C. with stirring for 4 h. Then 30 g (267 mmol) of 1-octene are added and the mixture is maintained at 80° C. for a further 10 h. After cooling to 20°–25° C., bleaching earth (Prolith Rapid®; manufacturer Caffaro, Milan/IT) is added and the mixture is filtered. Precipitation of the product with acetone gives 3.5 g of a compound of the average formula (based on $^1$H-NMR)

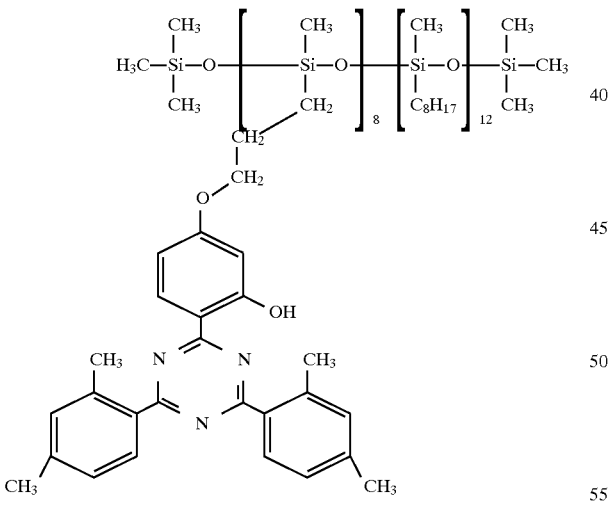

as a yellow resin ($M_n$=4,875 g/mol, $M_w$=10,100 g/mol; determined by GPC).

B5) 8.0 g (20 mmol) of polymethylhydridosiloxane (MW=400 g/mol) are added dropwise with stirring over the course of 1 h to a solution of 11.4 g (30 mmol) of 2-(4-allyloxy-2-hydroxyphenyl)-4,6-diphenyl)-1,3,5-triazine and 3 mg (0.008 mmol) of $PtCl_2$(styrene) complex in 50 ml of toluene which is maintained under nitrogen at 100° C. The mixture is maintained at 100° C. with stirring for 17 h. Then 30 g (267 mmol) of 1-octene are added and the mixture is maintained at 100° C. for a further 24 h. After cooling to 20°–25° C., the mixture is concentrated and the residue is purified by chromatography (silica gel; gradient toluene 1:1 toluene/ethyl acetate), to give 6.8 g of a compound of the average formula (based on $^1$H-NMR)

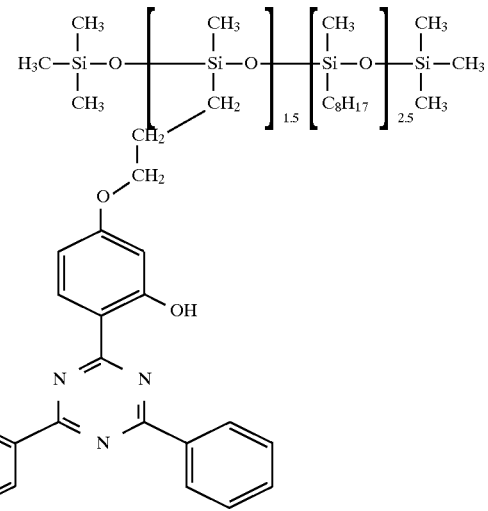

as a yellow resin ($M_n$=1,650 g/mol, $M_w$=2,470 g/mol; determined by GPC).

B6) A solution of 3.0 g (1.16 mmol) of polymethyl (3-glycidyloxypropyl)siloxane (compound from A1), 4.77 g (13.96 mmol) of 2-(2,4-dihydroxyphenyl)-4,6-diphenyl-1,3,5-triazine and 1.13 g (3.5 mmol) of tetrabutylammonium bromide in 40 ml of xylene is maintained at 120° C. with stirring and under nitrogen for 24 h. After cooling and concentration, the residue is purified by chromatography (silica gel, gradient from toluene to ethyl acetate), to give 3.0 g of a compound of the formula

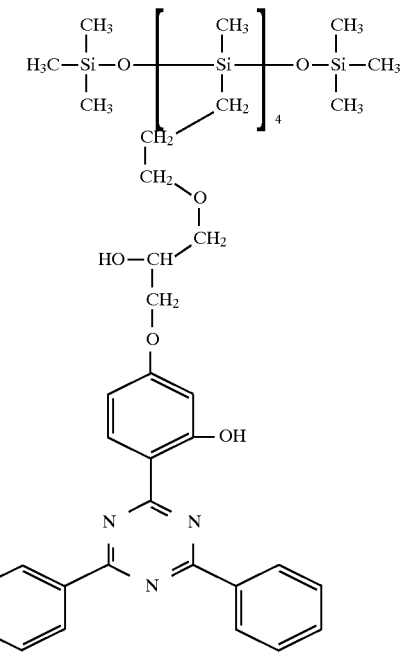

(average composition based on $^1$H-NMR) as a yellowish resin.

| Elemental analysis | % C | % H | % N | % Si |
|---|---|---|---|---|
| calculated | 63.70 | 6.07 | 7.55 | 7.57 |
| found | 61.99 | 6.00 | 6.90 | 8.13 |

B7) 5.8 g (60 mmol) of polymethylhydridodimethylsiloxane copolymer (MW=950 g/mol) are added dropwise with stirring over the course of 1 h to a solution maintained at 100° C. of 11.4 g (30 mmol) of 2-(4-allyloxy-2-hydroxyphenyl)-4,6-diphenyl-1,3,5-triazine and 3 mg (0.008 mmol) of $PtCl_2$(styrene) complex in 50 ml of toluene. The mixture is heated at 100° C. with stirring for 20 h. After cooling to 20°–25° C., it is concentrated and the product is purified by precipitation with acetone, to give 8.3 g of a compound of the average statistical formula (based on $^1$H-NMR)

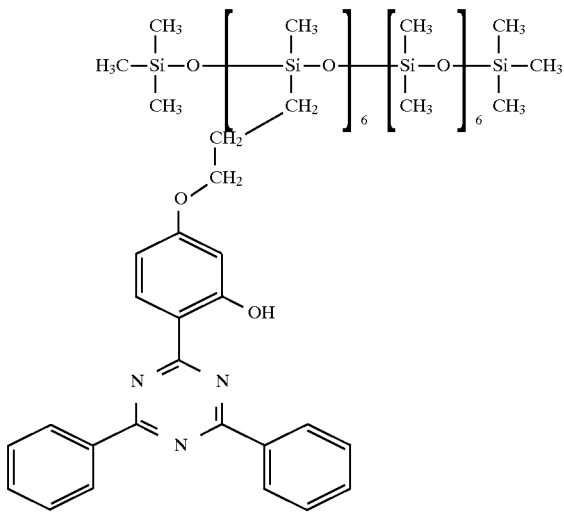

as a yellow solid ($M_n$=5,850 g/mol, $M_w$=10,760 g/mol; determined by GPC).

B8) A solution of 5.46 g (16 mmol) of 2-(2,4-dihydroxyphenyl)-4,6-diphenyl-1,3,5-triazine, 10 g (11.7 mmol) of methyloctylmethyl(3-glycidyloxypropyl)siloxane (compound from A3) and 0.5 g (1.5 mmol) of tetrabutylammonium bromide in 80 ml of xylene is maintained at reflux temperature with stirring and under nitrogen for 24 h. After cooling and concentration, the residue is purified by chromatography (silica gel; 95:5 toluene/ethyl acetate), to give 1.8 g of a compound of the statistical formula

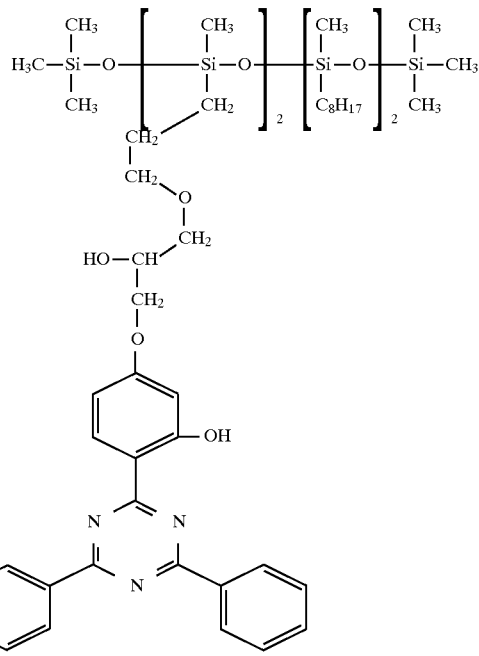

(average composition based on $^1$H-NMR) as a yellow resin ($M_n$=2,270 g/mol, $M_w$=3,600 g/mol; determined by GPC).

B9) 3.6 g (9 mmol) of polymethylhydridosiloxane (MW= 400 g/mol) are reacted as described in Example B3 with 13.1 g (30 mmol) of 2-(4-allyloxy-2-hydroxyphenyl)-4,6-di(2,4-dimethylphenyl)-1,3,5-triazine and 30 g (267 mmol) of 1-octene. Cooling to 20°–25° C. and chromatography (silica gel; gradient from 1:1 toluene/hexane to toluene) give 10.7 g of a compound of the average formula (based on $^1$H-NMR)

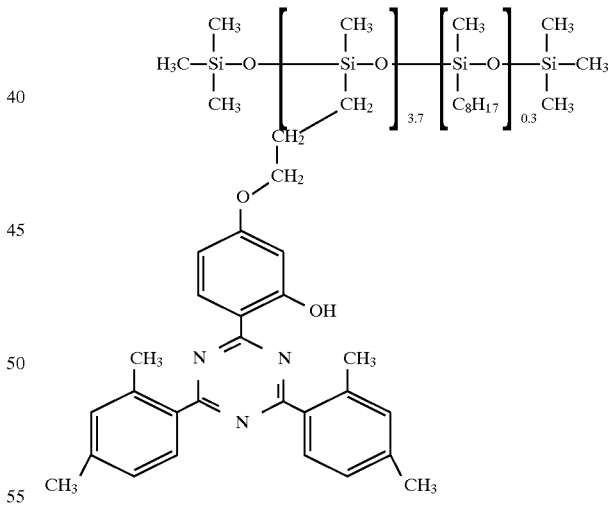

as a yellow resin ($M_n$=1,200 g/mol, $M_w$=1,750 g/mol; determined by GPC).

B10) In accordance with the procedure given in B8), and using 6.36 g (16 mmol) of 2-(2,4-dihydroxyphenyl)-4,6-bis (2,4-dimethylphenyl)-1,3,5-triazine, 3 g of a compound of the statistical formula

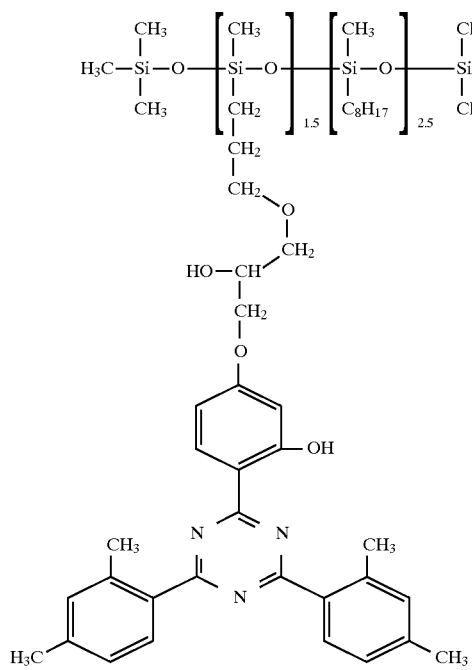

(average composition based on $^1$H-NMR) are obtained as a yellow resin ($M_n$=2,300 g/mol, $M_w$=3,700 g/mol; determined by GPC).

B11) A solution of 4.6 g (11.6 mmol) of 2-(2,4-dihydroxyphenyl)-4,6-bis(2,4-dimethyl-phenyl)-1,3,5-triazine, 5 g (5.8 mmol) of polymethyl (3-glycidyloxypropyl)siloxane (compound from A1) and 0.37 g (1.1 mmol) of tetrabutylammonium bromide in 80 ml of xylene is maintained at reflux temperature with stirring and under nitrogen for 24 h. After cooling and concentration, the residue is purified by chromatography (silica gel; 95:5 toluene/ethyl acetate), to give 7.8 g of a compound of the statistical formula

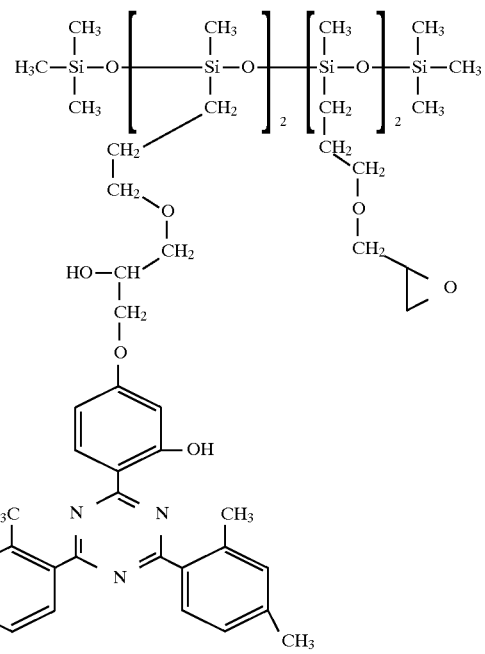

(average composition based on $^1$H-NMR) as a yellow resin ($M_n$=1,290 g/mol, $M_w$=1,950 g/mol; determined by GPC).

Epoxide number 1.21 mol/kg (calculated); 1.09 mol/kg (found).

B12) A solution of 4.6 g (11.6 mmol) of 2-(2,4-dihydroxyphenyl)-4,6-bis(2,4-dimethyl-phenyl)-1,3,5-triazine, 2.5 g (2.9 mmol) of polymethyl (3-glycidyloxypropyl)siloxane (compound from A1) and 0.2 g (0.6 mmol) of tetrabutylammonium bromide in 50 ml of xylene is maintained at reflux temperature with stirring and under nitrogen for 24 h. After cooling and concentration, the residue is purified by chromatography (silica gel; 95:5 toluene/ethyl acetate), to give 6.9 g of a compound of the statistical formula

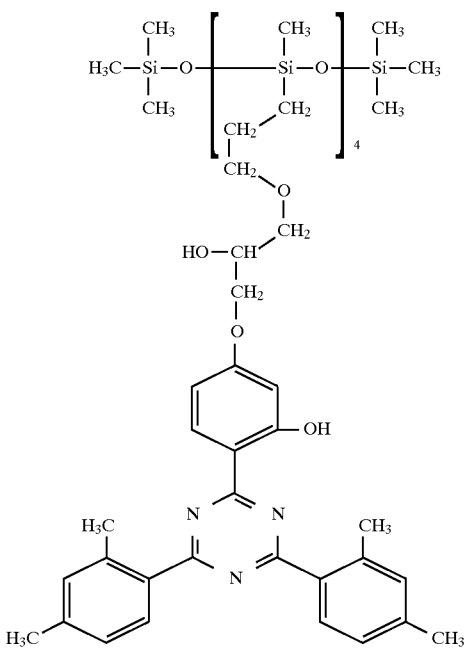

(average composition based on ¹H-NMR) as a yellow resin ($M_n$=1,350 g/mol, $M_w$=2,200 g/mol; determined by GPC).

B13) 3.6 g (15 mmol) of tetramethylcyclosiloxane are added at 100° C. with stirring over the course of 1 h to a solution of 11.4 g (30 mmol) of 2-(4-allyloxy-2-hydroxyphenyl)-4,6-diphenyl-1,3,5-tdiazine and 3 mg (0.008 mmol) of PtCl$_2$(styrene) complex in 50 ml of toluene. The mixture is heated at 100° C. with stirring for 12 h; then 10 g (89 mmol) of 1-octene are added and the mixture is heated at 100° C. for a further 24 h. After cooling to 20°–25° C., the mixture is concentrated and chromatographed (silica gel, toluene), to give 6.7 g of a compound of the average statistical formula (based on ¹H-NMR)

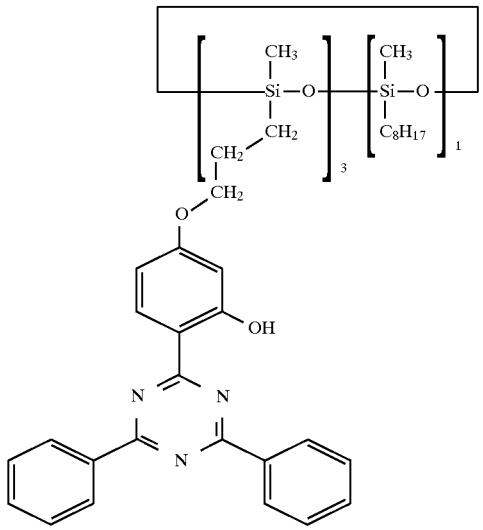

as a yellow resin ($M_n$=900 g/mol, $M_w$=1,380 g/mol; determined by GPC).

B14) The procedure indicated in Example B 13 is followed but using, instead of 2-(4-allyl-oxy-2-hydroxyphenyl)-4,6-diphenyl-1,3,5-triazine, 13.1 g (30 mmol) of 2-(4-allyloxy-2-hydroxyphenyl)-4,6-bis(2,4-dimethylphenyl)-1,3,5-triazine. 6.5 g of a compound of the average statistical formula (based on ¹H-NMR)

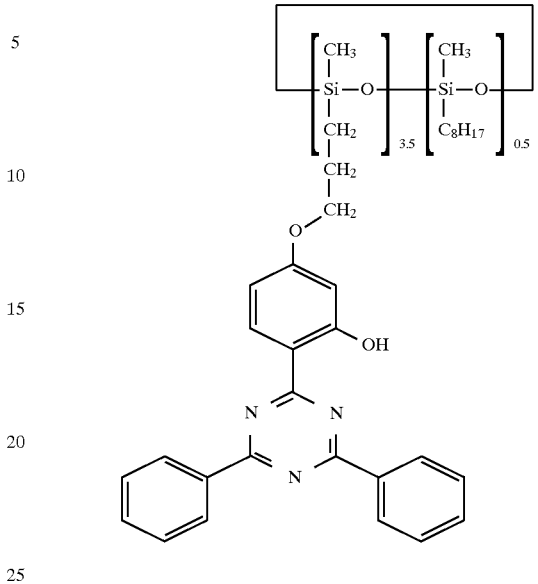

are obtained as a yellow resin ($M_n$=1,000 g/mol, $M_w$=2,640 g/mol; determined by GPC).

C) Use Examples

C1) Stabilization of a 2-coat metallic coating material

The compounds to be tested are dissolved in 20–25 g of Solvesso® 100[4] and are tested in a clearcoat of the following composition:

| | |
|---|---:|
| Synthacryl ® SC 303[1] | 27.51 |
| Synthacryl ® SC 370[2] | 23.34 |
| Maprenal ® MF 650[3] | 27.29 |
| Butyl acetate/butanol (37/8) | 4.33 |
| Isobutanol | 4.87 |
| Solvesso ® 100[4] | 2.72 |
| Kristallöl K-30[5] | 8.74 |
| Levelling assistant Baysilon ® MA[6] | 1.20 |
| | 100.00 g |

[1]Acrylate resin from Hoechst AG; 65% solution in 26:9 xylene/butanol
[2]Acrylate resin from Hoechst AG; 75% solution in Solvesso ® 100[4]
[3]Melamine resin from Hoechst AG; 55% solution in isobutanol
[4]Aromatic hydrocarbon mixture, boiling range 182–203° C. (Solvesso ® 150) or 161–178° C. (Solvesso ® 100); manufacturer: ESSO
[5]Aliphatic hydrocabon mixture, boiling range 145–200° C.; manufacturer: Shell
[6]1% in Solvesso ® 150[4]; manufacturer: Bayer AG 1.5 % of the compound to be tested is added to the clearcoat, based on the solids content of the coating material. The comparison material used is a clearcoat containing no light stabilizer.

The clearcoat is diluted to spray viscosity with Solvesso® 100 and applied by spraying to a prepared aluminium panel (coil coat, filler, silver metallic basecoat) and the resulting coating is stoved at 130° C. for 30 minutes, giving a dry film thickness of 40–50 μm of clearcoat.

The samples are then weathered in a UVCON® weathering apparatus from Atlas Corp. (UVB-313 lamps) with a cycle of 8 h UV irradiation at 70° C. and 4 h condensation at 50° C.

At regular intervals, the surface gloss (20° gloss according to DIN 67530) of the samples is measured and the samples are examined for cracks. The results are compiled in Table C1.

TABLE C1

| Stabilizer from Example | Cracking after | \multicolumn{5}{c}{Period of weathering} |
|---|---|---|---|---|---|---|
| | | 0 h | 800 h | 1600 h | 2000 h | 2400 h |
| none | 1,200 h | 86 | 46 | | | |
| B6 | 2,800 h | 86 | 89 | 86 | 85 | 54 |

Period of weathering up to cracking and 20° gloss after the period of weathering indicated The samples stabilized in accordance with the invention have a better weathering stability than the unstabilized comparison sample.

What is claimed is:

1. An oligomeric or polymeric compound of the formula I $$A - \left[\begin{array}{c} R^1 \\ | \\ Si-O \\ | \\ X \end{array}\right]_n \left[\begin{array}{c} R^2 \\ | \\ Si-O \\ | \\ H \end{array}\right]_m \left[\begin{array}{c} R^3 \\ | \\ Si-O \\ | \\ R^4 \end{array}\right]_p - B \quad (I)$$

or correspondingly crosslinked compound, in which the units of the formulae Ia, Ib and/or Ic $$-\left[\begin{array}{c} R^1 \\ | \\ Si-O \\ | \\ X \end{array}\right]- \quad (Ia)$$

$$-\left[\begin{array}{c} R^2 \\ | \\ Si-O \\ | \\ H \end{array}\right]- \quad (Ib)$$

$$-\left[\begin{array}{c} R^3 \\ | \\ Si-O \\ | \\ R^4 \end{array}\right]- \quad (Ic)$$

are arranged randomly or in blocks, and in which n is a number from the range 1–100;
m is a number from the range 0–100;
p is a number from the range 0–100;
A is a radical of the formula $$-O-\underset{\underset{R^{1''}}{|}}{\overset{\overset{R^{1'}}{|}}{Si}}-R^1;$$

B is a radical of the formula $$-\underset{\underset{R^{11''}}{|}}{\overset{\overset{R^{11'}}{|}}{Si}}-R^{11};$$

or A and B together are a direct bond when the sum n+m+p is a number from the range 3–10 and the sum m+p is greater than 0;

$R^1, R^{1'}, R^{1''}, R^{11}, R^{11'}, R^{11''}, R^2$ and $R^3$, independently of one another, are $C_1$–$C_{18}$alkyl, $C_5$–$C_2$cycloalkyl or phenyl;

$R^4$ is $C_1$–$C_{18}$alkyl, phenyl, $C_2$–$C_6$hydroxyalkyl, $C_2$–$C_6$aminoalkyl, $$-(C_rH_{2r})-O-CH_2CH\overset{O}{\underset{}{\diagdown}}CH_2,$$

$$-(CH_2)_r\overset{O}{\underset{O}{\diagdown}}, \quad -(C_sH_{2s})-\underset{O}{\diagdown}CH_3$$

or $$-(CH_2)_s-CH\overset{O}{\underset{}{\diagdown}}CH_2,$$

where r is a number from the range 2–6 and s is 2 or 3;

X is a mono- or divalent radical of the formula II (II)

where $R^5$ and $R^7$, independently of one another, are hydrogen, $C_1$—$C_{12}$alkyl, $C_3$–$C_6$alkenyl, halogen or CN;

$R^6$ is hydrogen, $C_1$–$C_{12}$alkyl, $C_3$–$C_6$alkenyl, halogen, CN, a cycloaliphatic, saturated hydrocarbon radical containing 5–12 carbon atoms, or is phenyl; or $R^5$ is OH, $C_1$–C18alkoxy or $C_3$—$C_6$alkenoxy; $R^7$ is hydrogen; and $R^6$ as a monovalent radical is OH, $C_1$–$C_{18}$alkoxy, $C_3$–$C_6$alkenoxy or —O—$CH_2$—CH($OR^{12}$)—$CH_2$—O—$R^{17}$, or $R^6$ is a divalent radical of the formula —O—Z— which is attached to the phenyl ring by the oxygen atom;

$R^8$ is as defined for $R^5$;
$R^9$ is as defined for $R^6$; and
$R^{10}$ is as defined for $R^7$;
$R^{12}$ is hydrogen or $C_1$–$C_{18}$alkyl;
$R^{16}$ is hydrogen, $C_1$–$C_{24}$alkyl, $C_5$–$C_{12}$cycloalkyl or $C_7$–$C_{15}$phenylalkyl;
$R^{17}$ is $C_1$–$C_{18}$alkyl;

—O—Z— is a radical which is attached to the phenyl ring by the oxygen atom and is of the formula —O—$(CH_2)_q$—O—$R^{21}$-,

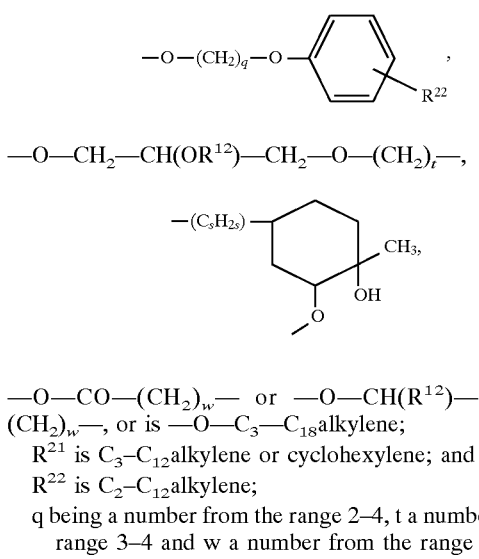

—O—CO—(CH$_2$)$_w$— or —O—CH(R$^{12}$)—CO—O—(CH$_2$)$_w$—, or is —O—C$_3$—C$_{18}$alkylene;

R$^{21}$ is C$_3$–C$_{12}$alkylene or cyclohexylene; and

R$^{22}$ is C$_2$–C$_{12}$alkylene;

q being a number from the range 2–4, t a number from the range 3–4 and w a number from the range 3–12.

2. A compound of the formula I or correspondingly crosslinked compound according to claim 1, wherein X is a radical of the formula IIa

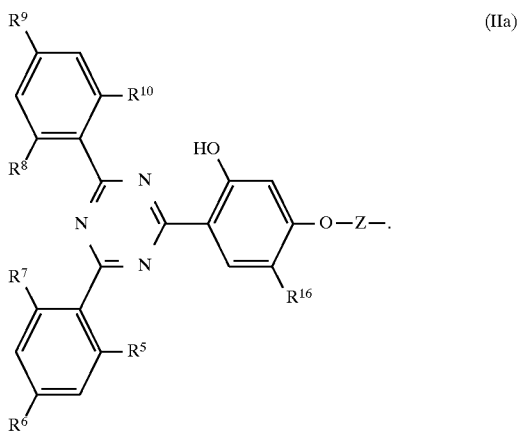

(IIa)

3. A compound of the formula I or correspondingly crosslinked compound according to claim 1, werein R$^1$,R$^{1'}$, R$^{1''}$, R$^{11}$, R$^{11''}$, R$^{11'''}$, R$^2$ and R$^3$ are methyl;

R$^4$ is C$_1$–C$_{18}$ alkyl, hydroxypropyl, aminopropyl or

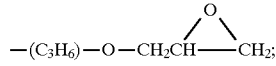

R$^5$ and R$^7$ are, independently of one another, hydrogen or C$_1$–C$_4$alkyl;

R$^6$ is hydrogen, C$_1$–C$_4$alkyl or phenyl; or

R$^5$ is OH or C$_1$–C$_6$alkoxy or C$_3$–C$_6$alkenoxy; R$^7$ is hydrogen; and R$^6$ as a monovalent radical is one of OH, C$_1$–C$_6$alkoxy or —O—CH$_2$—CH(OR$^{12}$)—CH$_2$—O—R$^{17}$, or R$^6$ is a divalent radical of the formula —O—Z— which is attached to the phenyl ring by the oxygen atom;

R$^8$ is as defined for R$^5$;

R$^9$ is as defined for R$^6$; and

R$^{10}$ is as defined for R$^7$;

R$^{12}$ is hydrogen or C$_1$–C$_8$alkyl;

R$^{16}$ is hydrogen;

R$^{17}$ is C$_1$C$_{18}$alkyl; and

—O—Z— is a radical which is attached to the phenyl ring by the oxygen atom and is of the formula —O—CH$_2$—CH(OR$^{12}$)—CH$_2$—O—(CH$_2$)$_3$—, —O—CO—(CH$_2$)$_3$—, in which w is a number from the range 3–12, or is —O—C$_3$—C$_6$alkylene.

4. A compound of the formula I or correspondingly crosslinked compound according to claim 2, in which n is a number from the range 1–100;

m is 0;

p is a number from the range 0–100; and the sum n+p is a number from the range 3–100;

A is trimethylsilyloxy and B is trimethylsilyl; or A and B together are a direct bond, where the sum of the units of the formulae Ia and Ic is from 3 to 7;

R$^1$, R$^2$ and R$^3$ are methyl;

R$^4$ is C$_1$–C$_{18}$alkyl or

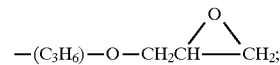

R$^5$ and R$^7$, independently of one another, are hydrogen or methyl;

R$^6$ is hydrogen, methyl or phenyl;

R$^8$ is as defined for R$^5$;

R$^9$ is as defined for R$^6$;

R$^{10}$ is as defined for R$^7$;

R$^{16}$ is hydrogen; and

—O—Z— is —O—C$_3$—C$_6$alkylene or —O—CH$_2$—CH(OH)—CH$_2$—O—(CH$_2$)$_3$—.

5. A compound according to claim 1 obtained by reacting an unsaturated compound of the formula IV

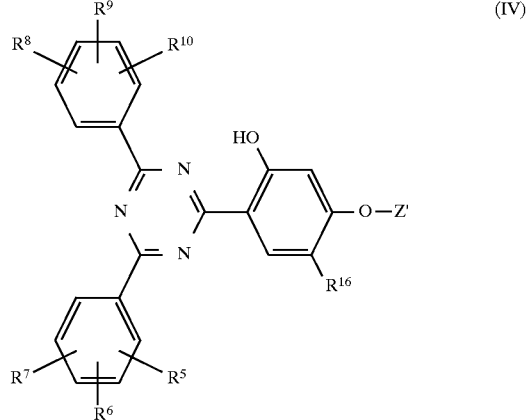

(IV)

with a Si-H-containing compound of the formula VI

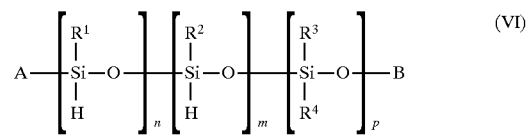

(VI)

in which Z' is of the formula —(CH$_2$)$_q$—O—R$^{23}$,

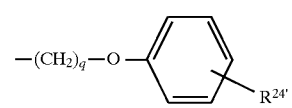

—$CH_2$—$CH(OR^{12})$—$CH_2$—O—$(CH_2)_{p-2}$—CH=$CH_2$,

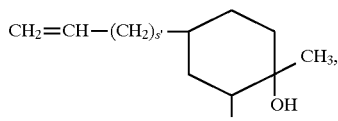

—CO—$(CH_2)_{w-2}$—CH=$CH_2$ or —$CH(R^{12})$—CO—O—$(CH_2)_{w-2}$—CH=$CH_2$ or is $C_3$–$C_{18}$alkenyl;

$R^{23}$ is $C_3$–$C_{12}$alkenyl or cyclohexenyl;

$R^{24}$ is $C_2$–$C_{12}$alkenyl; and s' is 0 or 1;

and the other symbols are as defined in claim 1;

or by reacting an unsaturated compound of the formula IV with a compound of the formula VII

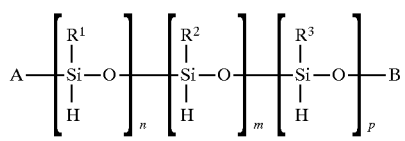

and an unsaturated compound VIII selected from the group consisting of $C_2$–$C_{18}$alkene, especially $C_3$–$C_{18}$alkene, $C_3$–$C_6$hydroxyalkene, $C_3$–$C_6$aminoalkene,

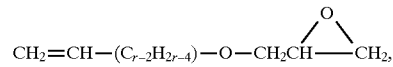

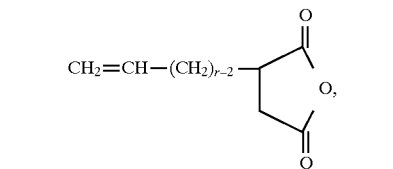

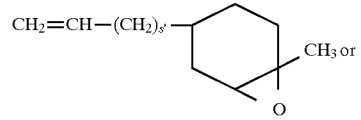

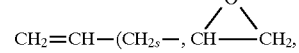

employing n molar fractions of the unsaturated compound of the formula IV and p molar fractions of the unsaturated compound VIR per n+m+p molar fractions of the compound of the formula VII.

* * * * *